US010661878B1

(12) United States Patent
Bonang et al.

(10) Patent No.: US 10,661,878 B1
(45) Date of Patent: May 26, 2020

(54) UNMANNED AERIAL VEHICLE (UAV) LAUNCH SYSTEMS AND METHODS

(71) Applicant: THE BOEING COMPANY, Chicago, IL (US)

(72) Inventors: James Joseph Bonang, Garden Grove, CA (US); Michael Jeffrey Greenfield, Anaheim, CA (US); Christopher Stephan van Harmelen, Fremont, CA (US)

(73) Assignee: THE BOEING COMPANY, Chicago, IL (US)

( * ) Notice: Subject to any disclaimer, the term of this patent is extended or adjusted under 35 U.S.C. 154(b) by 348 days.

(21) Appl. No.: 15/884,929

(22) Filed: Jan. 31, 2018

(51) Int. Cl.
*B64C 1/40* (2006.01)
*B64B 1/40* (2006.01)

(52) U.S. Cl.
CPC .......... *B64B 1/40* (2013.01); *B64C 2201/022* (2013.01); *B64C 2201/082* (2013.01); *B64C 2201/101* (2013.01); *B64C 2201/201* (2013.01)

(58) Field of Classification Search
CPC ...................................................... B64B 1/40
See application file for complete search history.

(56) References Cited

U.S. PATENT DOCUMENTS

| 4,075,725 | A | * | 2/1978 | Mar ..................... | G10K 11/006 |
| | | | | | 367/4 |
| 4,296,894 | A | | 10/1981 | Schnabele | |
| 4,410,151 | A | | 10/1983 | Hoppner | |
| 4,433,638 | A | * | 2/1984 | Ashline ................. | G08B 5/002 |
| | | | | | 116/210 |
| 4,844,380 | A | | 7/1989 | Peoples | |
| 5,118,052 | A | | 6/1992 | Alvarez | |
| 5,456,427 | A | * | 10/1995 | Greenhalgh .......... | B63B 22/003 |
| | | | | | 102/384 |
| 7,801,522 | B2 | * | 9/2010 | Knoblach ................ | B64B 1/40 |
| | | | | | 455/431 |
| 8,240,602 | B1 | * | 8/2012 | Lloyd ...................... | B64B 1/40 |
| | | | | | 244/31 |
| 8,292,215 | B2 | | 10/2012 | Olm | |
| 8,492,692 | B2 | | 7/2013 | Fisher | |
| 8,505,430 | B2 | | 8/2013 | Miralles | |
| 8,662,441 | B2 | | 3/2014 | Powell | |
| 8,989,922 | B2 | | 3/2015 | Jones | |
| 9,187,184 | B2 | | 11/2015 | Miralles | |
| 9,470,477 | B2 | | 10/2016 | Su | |
| 9,612,085 | B2 | | 4/2017 | Powell | |
| 2010/0012774 | A1 | * | 1/2010 | Fanucci ................ | B64C 39/024 |
| | | | | | 244/49 |
| 2010/0270425 | A1 | * | 10/2010 | Zur .................. | G08B 13/19632 |
| | | | | | 244/33 |

(Continued)

*Primary Examiner* — Michael H Wang
(74) *Attorney, Agent, or Firm* — The Small Patent Law Group LLC; Joseph M. Butscher

(57) ABSTRACT

An unmanned aerial vehicle (UAV) launch system includes a launch container including a housing defining an internal chamber. A UAV includes a main body defining an inflatable envelope. The UAV is configured to be contained within the internal chamber. The main body is in a deflated state when the UAV is contained within the internal chamber. A reactant is configured to react with water to produce a lifting gas. The inflatable envelope is configured to be inflated by the lifting gas in response to the reactant reacting with the water to deploy the UAV from the launch container.

20 Claims, 4 Drawing Sheets

(56) References Cited

U.S. PATENT DOCUMENTS

| | | | |
|---|---|---|---|
| 2011/0073707 A1* | 3/2011 | Bossert | F41F 3/07 |
| | | | 244/63 |
| 2011/0315817 A1* | 12/2011 | Miralles | F41F 3/042 |
| | | | 244/63 |
| 2012/0001020 A1 | 1/2012 | Miralles | |
| 2012/0138727 A1 | 6/2012 | Fisher | |
| 2015/0008280 A1* | 1/2015 | Smoker | B64F 1/04 |
| | | | 244/63 |
| 2015/0175276 A1 | 6/2015 | Koster | |
| 2015/0259066 A1 | 9/2015 | Johannesson | |
| 2015/0266578 A1* | 9/2015 | Elkins | B64C 39/024 |
| | | | 244/137.1 |
| 2015/0267996 A1 | 9/2015 | Su | |
| 2016/0039536 A1 | 2/2016 | Miralles | |
| 2016/0178317 A1* | 6/2016 | Powell | F41F 3/07 |
| | | | 89/1.81 |
| 2016/0347476 A1 | 12/2016 | Andryukov | |
| 2017/0057635 A1 | 3/2017 | Strayer | |
| 2017/0329047 A1* | 11/2017 | Shimizu | B64C 39/024 |
| 2017/0355462 A1* | 12/2017 | Hoheisel | B64D 1/12 |

\* cited by examiner

UNMANNED AERIAL VEHICLE (UAV) LAUNCH SYSTEMS AND METHODS

FIELD OF THE DISCLOSURE

Embodiments of the present disclosure generally relate to systems and methods for launching unmanned aerial vehicles (UAVs).

BACKGROUND OF THE DISCLOSURE

Unmanned aerial vehicles (UAVs), such as drones, are used in a wide variety of applications. For example, in military applications, drones may be deployed to monitor various locations, deliver ordnance on a target, and/or the like. Drones may be deployed from various platforms, such as on land or sea. For example, a drone may be deployed from a base on land, or from a deck of a ship on a body of water.

Typically, a drone includes one or more propulsion systems, such as one or more motors having propeller blades attached thereto. Each propulsion system extends outwardly from a main housing of the drone. As such, a drone may define an outer axial cross-section that includes the main housing and one or more propulsion systems extending from the main body.

Due to their size, however, drones may occupy relatively large amounts of space within a confined area. For example, fuselage sections of drones occupy space. The size, shape, and somewhat delicate nature (such as propellers) of drones often make assembly processes and transport (for example, shipping) between locations awkward and time-consuming.

SUMMARY OF THE DISCLOSURE

Needs exist for efficient systems and methods of storing and deploying UAVs, such as drones.

With those needs in mind, certain embodiments of the present disclosure provide an unmanned aerial vehicle (UAV) launch system that includes a launch container including a housing defining an internal chamber. A UAV includes a main body defining an inflatable envelope. The UAV is configured to be contained within the internal chamber. The main body is in a deflated state when the UAV is contained within the internal chamber. A reactant is configured to react with water to produce a lifting gas. The inflatable envelope is configured to be inflated by the lifting gas in response to the reactant reacting with the water to deploy the UAV from the launch container.

In at least one embodiment, the lifting gas includes hydrogen. The reactant may include sodium borohydride and boric oxide. The reactant may be contained within a reactant container. The reactant container may be within the internal chamber of the launch container. The UAV launch system may also include a water inlet port that is configured to channel the water to the reactant.

The weight of the reactant may be between 50 percent and 100 percent of the weight of the UAV. A volume ratio between the UAV and the reactant within the internal chamber of the launch container may be 9:1.

In at least one embodiment, the launch container further includes a cover moveably coupled to the housing. The cover is moveable between an open position and a closed position. Inflation of the inflatable envelope causes the cover to move from the closed position to the open position. A portion of the UAV may form the cover.

The UAV may include an inflation inlet port in fluid communication with the inflatable envelope. In at least one embodiment, the reactant is contained within a reactant container that is in fluid communication with the inflation inlet port through a detachable coupling. The main body detaches from the detachable coupling in response to the UAV inflating into an inflated state.

The UAV may include a propulsion system, and/or a payload. The payload may include a control unit, one or more batteries, a communication device, an imaging system, a navigation system, ordnance, and/or the like.

The UAV launch system may also include one or more pontoons coupled to the launch container. A container of helium may be in fluid communication with the pontoon(s). The pontoons may be configured to be inflated by the helium.

Certain embodiments of the present disclosure provide an unmanned aerial vehicle (UAV) launch method that includes providing a launch container including a housing defining an internal chamber, securing a UAV including a main body defining an inflatable envelope within the internal chamber (wherein the securing includes providing the main body in a deflated state), exposing a reactant to water to cause a reaction that produces a lifting gas, inflating the inflatable envelope with the lifting gas due to the exposing, and deploying the UAV from the launch container due to the inflating. The UAV launch method may also include channeling the water to the reactant via a water inlet port.

DETAILED DESCRIPTION OF THE DISCLOSURE

Figure 1:
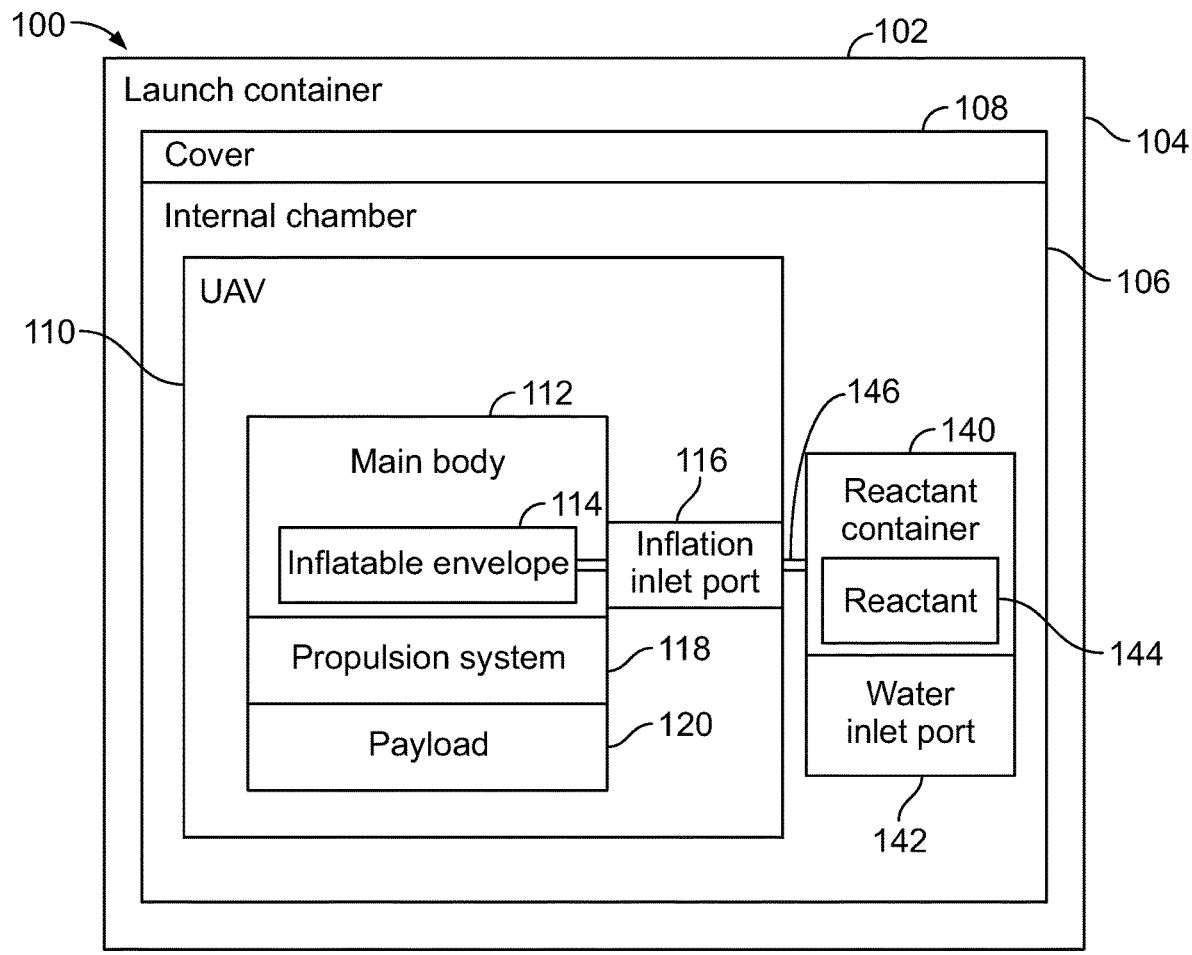
FIG. 1 illustrates a simplified schematic diagram of an unmanned aerial vehicle (UAV) launch system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide UAV launch systems and methods that include a launch container including compact reactant chemicals that react with water, such as salt water, to produce a lifting gas (such as hydrogen) to inflate a main body of a UAV. When the main body is inflated, the UAV is a lighter-than-air vehicle that ascends into the air, such an airship or dirigible.

In at least one embodiment, the UAV is configured to ascend from the launch container and provide persistent, airborne over-the-horizon communication capability. The UAV launch system, including the launch container and the UAV, is configured to be moved into a body of water, such as from watercraft (such as a submarine or boat), aircraft (such as an airplane or helicopter), a land-based vehicle or structure (such as an ejection gun secured to a vehicle or fixed on land), or even dropped or thrown into the body of water by an individual.

The UAV is in a stowed, uninflated state within the launch container until released into a body of water. The UAV launch system includes a reactant container that contains reactant chemicals. When the reactant chemicals are combined with water (such as salt water), the ensuring reaction produces a lifting gas, such as hydrogen, that inflates the main body of the UAV, which inflates and deploys from the launch container.

The UAV may include a payload having a wide range of components, depending on a particular mission. For example, the payload may include communication devices (such as antennas, transceiver, radios, or the like) for over-the-horizon communications, hydrocarbon sensors, a magnetic anomaly detector (MAD), underwater acoustic sensors and modems, a satellite modem, electro-optical sensors, an imaging system, a navigation sub-system, ordnance, and/or the like.

Certain embodiments of the present disclosure provide a UAV launch system that includes a reactant (such as a chemical compound), a UAV including a main body in a stowed, uninflated state, and a launch container that stores the reactant and the UAV in the stowed, uninflated state. In response to the launch container contacting water (such as salt water), the reactant interacts with the water to produce a lifting gas (such as hydrogen) that inflates the UAV. As the UAV inflates, the UAV deploys from the launch container.

Certain embodiments of the present disclosure provide UAV launch systems and methods that provide an extremely long endurance sensor platform and communication relay for anti-submarine warfare (ASW) missions at comparatively low cost, and which may be rapidly deployed. In the deployed, inflated state, the UAV is configured to hover using passive aerostatic lift.

Certain embodiments of the present disclosure provide a UAV launch system that includes a launch container (such as canister), which may include inflatable pontoons for providing buoyancy to the launch container. The inflatable pontoons may be configured to inflate using a small quantity of compressed helium upon contact with a body of water. Optionally, the inflatable pontoons may be inflated by inflation gas that inflates the main body of the UAV. In at least one other embodiment, the launch container itself may be buoyant and not need inflatable pontoons to ascend to and float at a water surface.

A UAV includes a main body having an inflatable envelope that is stowed within the launch container in a stowed, uninflated (or deflated) state. A reaction apparatus including a detachable conduit is coupled to the inflatable envelope. The reaction apparatus contains dry reactant that is configured to produce a lighter-than-air gas that is vented into the inflatable envelope in response to water (such as salt water) contacting the reactant within the reaction apparatus. The detachable conduit is configured to detach from the UAV when the inflatable envelope is fully inflated.

The UAV may be inflated when the launch container is released into a body of seawater. As the UAV inflates to a fully inflated state, the UAV launches from the launch container into an airborne deployed state.

In at least one embodiment, the weight of the reactant contained within the reaction apparatus is between 50 percent and 100 percent of the weight of the UAV.

Additionally, an accelerator may be disposed in the reaction apparatus with the reactant. In at least one embodiment, the accelerator includes boric oxide.

FIG. 1 illustrates a simplified schematic diagram of a UAV launch system 100, according to an embodiment of the present disclosure. The UAV launch system 100 includes a launch container 102 (such as a canister) including an outer housing 104 that defines an internal chamber 106 and a cover 108 that closes the internal chamber 106 in a closed position, and exposes the internal chamber 106 in an open position. The launch container 102 may be tubular, for example. Alternatively, the launch container 102 may be formed in various other shapes or sizes, such as a rectangular box, sleeve, or the like. As described herein, inflation of a main body 112 of a UAV 110 may cause the cover 108 to move from the closed position to the open position. As a non-limiting example, the launch container 102 may be a cylindrical container having a diameter between 5-10 inches, and a length of 2-10 feet.

A pivot member, such as a hinge, may be configured to allow the cover 108 to be pivoted between closed and open positions. In at least one other embodiment, the launch container 102 may not include a pivot member. Instead, the cover 108 may be removably secured to the housing 104 such as through a press fit, an interference fit, and/or the like. The cover 108 may be configured to separate from the housing 104 upon exertion of a defined force, such as that exerted by an inflating or inflated UAV 110. In at least one embodiment, a portion of the UAV 110 may form the cover 108. For example, a nose of the UAV 110 may form the cover. In at least one other embodiment, the launch container 102 may not include the cover 108. Instead, the launch container 102 may include an open end. In at least one other embodiment, instead of a cover, the launch container 102 may include a thin membrane (such as formed of plastic, cardboard, an elastomeric material, and/or the like) that may be punctured by an inflating or inflated UAV 110.

The launch container 102 contains an unmanned aerial vehicle (UAV) (or drone) 110 in a stowed, uninflated (or deflated) state within the internal chamber 106. The UAV 110 includes a main body 112 defining an inflatable envelope 114 in fluid communication with an inflation inlet port 116. The inflatable envelope 114 is configured to be inflated with lighter-than-air gas (such as hydrogen) such that the UAV 110 rises within air. As such, the UAV 110 may be a dirigible or airship.

The UAV 110 may also include a propulsion system 118. In at least one embodiment, the propulsion system 118 includes one or more rotors, propellers, or the like coupled to one or more motors, engines, or the like. Optionally, the UAV 110 may not include a propulsion system 118.

In at least one embodiment, the UAV 110 includes a payload 120. The payload 120 includes one or more components configured for a mission of the UAV 110.

Figure 2:
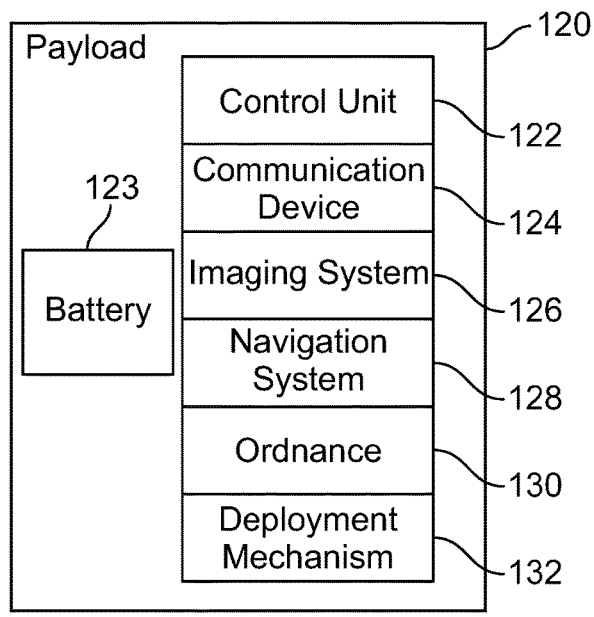
FIG. 2 illustrates a simplified schematic diagram of a payload, according to an embodiment of the present disclosure.

FIG. 2 illustrates a simplified schematic diagram of the payload 120, according to an embodiment of the present disclosure. Referring to FIGS. 1 and 2, the payload 120 may include a control unit 122 that is configured to control operation of the UAV 110. The control unit 122 is operatively coupled to a communication device 124, such through one or more wired or wireless connections. The control unit 122 may be configured to control operation of the communication device 124. The communication device 124 may be one or more antennas, one or more radios, one or more transceivers, and/or the like. Optionally, the payload 120 may not include the control unit 122 and/or the communication device 124.

One or more batteries 123 (such as lithium ion batteries) may provide a power source for the UAV 110. The batter(ies) 123 may be rechargeable. For example, the batter(ies) 123 may be solar cells that are recharged through solar energy. Optionally, the batter(ies) 123 may be recharged through thermal energy or wind energy.

The payload 120 may include an imaging system 126, which may be in communication with the control unit 122 through one or more wired or wireless connections. The control unit 122 may be configured to control operation of the imaging system 126. The imaging system 126 may include one or more cameras, thermal imaging devices, infrared imaging devices, ultrasonic imaging devices, and/or the like. Optionally, the payload 120 may not include the imaging system 126.

The payload 120 may include a navigation system 128, which may be in communication with the control unit 122 through one or more wired or wireless connections. The control unit 122 may be configured to control operation of the navigation system 128. The navigation system 128 may be a global positioning system (GPS), for example. Optionally, the payload 120 may not include the navigation system 126.

The payload 120 may include ordnance 130. A deployment mechanism 132 may be operatively coupled to the ordnance 130. The control unit 122 may be in communication with the deployment mechanism 132, which is configured to deploy the ordnance 130 from the UAV 110, such as through one or more wired or wireless connections. Optionally, the payload 120 may not include the ordnance 130 and the deployment mechanism 132.

The payload 120 may include more or less components than shown, depending on a particular mission of the UAV 110. For example, the payload 120 may include hydrocarbon sensors, a magnetic anomaly detector (MAD), underwater acoustic sensors and modems, a satellite modem, electro-optical sensors, and/or the like.

As described herein, the control unit 122 may be used to control operation of one or more components of the UAV 110. As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 122 may be or include one or more processors that are configured to control operation of the component(s) of the UAV 110.

The control unit 122 is configured to execute a set of instructions that are stored in one or more storage elements (such as one or more memories), in order to process data. For example, the control unit 122 may include or be coupled to one or more memories. The storage elements may also store data or other information as desired or needed. The storage elements may be in the form of an information source or a physical memory element within a processing machine.

The set of instructions may include various commands that instruct the control unit 122 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 122. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 122 may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Referring again to FIG. 1, the launch container 102 also includes a reactant container 140 in fluid communication with a water inlet port 142. The reactant container 140 contains dry reactant 144, such as a compound of chemicals that are configured to produce a lighter-than-air gas (such as hydrogen) when in contact with water (such as salt water).

The reactant 144 may be or include one or more chemicals that react with water (such as seawater) to produce an inflation gas, such as hydrogen. For example, the reactant 144 may be or include sodium borohydride and an accelerator, such as boric oxide.

The reactant container 140 is in communication with the inflation inlet port 116 of the UAV 110 through a detachable coupling 146. The water inlet port 142 may be an opening formed in the housing 104 of the launch container 102 that is in fluid communication with the reactant container 140. Optionally, the water inlet port 142 may be a conduit extending out of the launch container 102.

As shown, the reactant container 140 and the water inlet port 142 may be at least partially within the internal chamber 106. Optionally, the reactant container 140 and the water inlet port 142 may be disposed on an outside of the housing 104. In at least one other embodiment, the reactant container 140 may be part of the internal chamber 106. For example, the reactant 144 may be disposed within the internal chamber 106, instead of within a separate and distinct container within the internal chamber 106 or otherwise secured to the housing 104.

It is to be understood that the launch container 102, the UAV 110, the reactant container 140, the water inlet port 142 and other components shown in FIGS. 1 and 2 are not drawn to scale.

In operation, in order to deploy the UAV 110 from the launch container 102, the launch container 102 is positioned within a body of water, such as seawater. For example, the launch container 102 may be launched into the body of water from watercraft (such as a submarine or ship), dropped or launched from an aircraft (such as an airplane or helicopter), dropped or launched from a land-based structure, or even dropped or thrown in the body of the water by an individual.

The launch container 102 may be naturally buoyant and float to a surface of the water. Optionally, the launch container 102 may include one or more buoyant structures (such as inflatable pontoons) which ensure that the launch container 102 floats at a surface of the body water. In at least one embodiment, the inflatable pontoons may be operatively coupled to compressed helium that releases the helium into the pontoons (thereby inflating the pontoons) upon impact with the body of water.

When the launch container 102 is in the body of water, water passes into the reactant container 140 via the water inlet port 142. As the water contacts the reactant 144 within the reactant container 140, the reaction therebetween produces a lighter-than-air inflation gas (such as hydrogen). The inflation gas passes into the inflation inlet port 116 of the UAV 110 via the detachable coupling 146. The inflation gas passes into the inflatable envelope 114 of the main body 112 through the inflation inlet port 116. As the inflation gas passes into the inflatable envelope 114, the inflation gas inflates the inflatable envelope 114 of the main body 112. As the main body 112 inflates, the main body 112 exerts pressure on the cover 108, thereby opening the cover and exposing the inflating UAV 110 within the internal chamber 106. With continued inflation, the main body 112 extends out of the exposed internal chamber 106. When completely inflated (that is, in an inflated state), the UAV 110 detaches from the detachable coupling 146 and ascends out of the launch container 102 into the air. The inflated main body 112 causes the UAV 110 to be airborne. As such, the UAV 110 deploys from the launch container 102 and proceeds on a particular mission.

Figure 3:
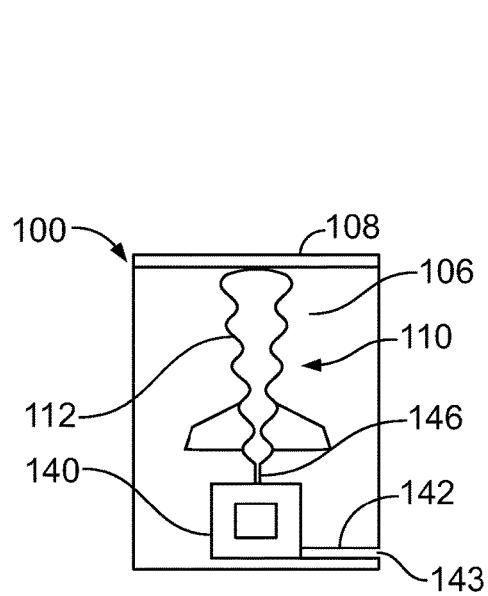
FIG. 3 illustrates a simplified view of a UAV launch system containing a UAV in a stowed, deflated state, according to an embodiment of the present disclosure.

FIG. 3 illustrates a simplified view of the UAV launch system 100 containing the UAV 110 in a stowed, deflated state, according to an embodiment of the present disclosure. As shown, the main body 112 of the UAV 110 is deflated and contained within the internal chamber 106 of the launch container 102 with the cover 108 closing the internal chamber 106. The main body 112 is connected to the reactant container 140 by the detachable coupling 146. The water inlet port 142 is in fluid communication with an internal chamber of the reactant container 140, and includes an opening 143 that allows water to pass therein.

Figure 4:
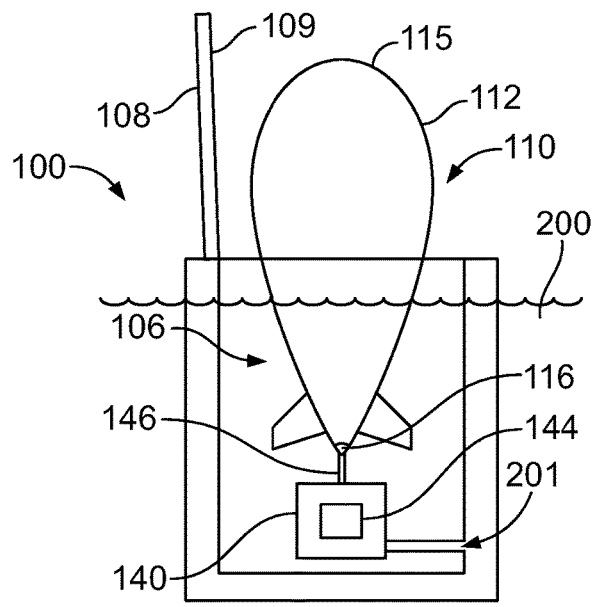
FIG. 4 illustrates a simplified view of a UAV inflating and deploying from a launch container of a UAV launch system, according to an embodiment of the present disclosure.

FIG. 4 illustrates a simplified view of the UAV 110 inflating and deploying from the launch container 102 of the UAV launch system 100, according to an embodiment of the present disclosure. As shown, the launch container 102 floats in a body of water 200 (such as sea water). A portion 201 of the water 200 enters the reactant container 140 via the water inlet port 142. The water 200 reacts with the reactant 144 within the reactant container 140 to generate the inflation gas, which passes into the main body 112 through the coupling 146 connected to the inflation inlet port 116, thereby inflating the main body 112 into an inflated state. As the main body 112 inflates, a top portion 115 is urged into an underside 109 of the cover 108. With increased inflation, the force exerted by the main body 112 into the cover 108 causes the cover 108 to open, thereby allowing the main body 112 to continue to inflate and expand outside of the internal chamber 106. In at least one embodiment, the UAV launch system 100 may be configured to float length-wise on the water 200.

Figure 5:
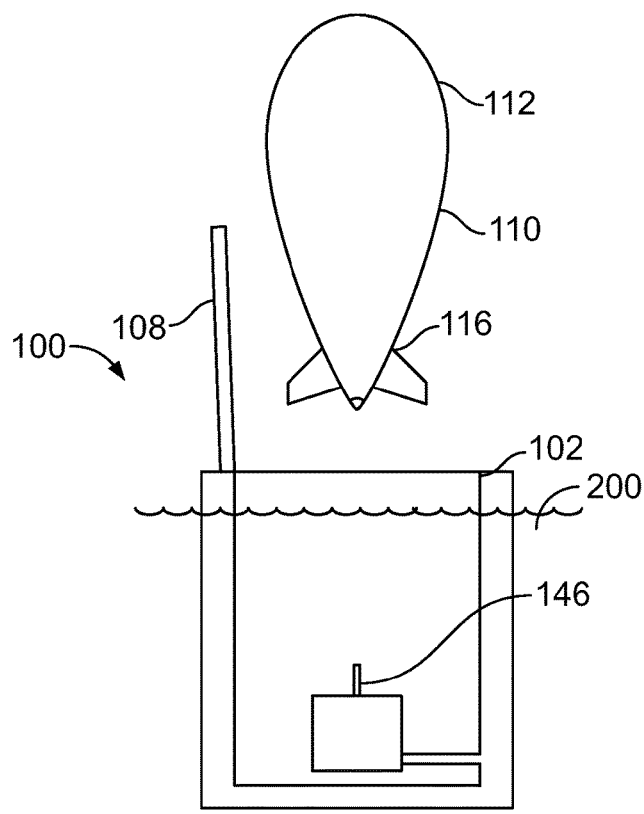
FIG. 5 illustrates a simplified view of a UAV deployed out of a launch container of a UAV launch system, according to an embodiment of the present disclosure.

FIG. 5 illustrates a simplified view of the UAV 110 deployed out of the launch container 102 of the UAV launch system 100, according to an embodiment of the present disclosure. Upon fully inflating into the inflated state, the main body 112 detaches from the detachable coupling 146, thereby allowing the UAV 110 to ascend into the air away from the launch container 102. The inflation inlet port 116 may include a valve (not shown) that closes as the main body 112 detaches from the detachable coupling 146, thereby ensuring that the inflation gas remains within the main body 112 so that the UAV 110 remains airborne.

Figure 6:
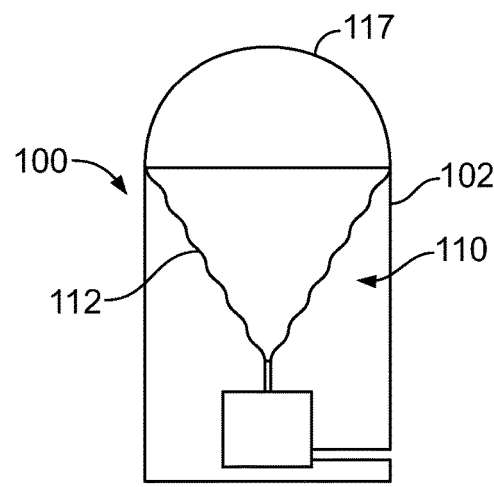
FIG. 6 illustrates a simplified view of a UAV launch system containing a UAV in a stowed, deflated state, according to an embodiment of the present disclosure.

FIG. 6 illustrates a simplified view of the UAV launch system 100 containing the UAV 110 in a stowed, deflated state, according to an embodiment of the present disclosure. In this embodiment, a nose 117 of the main body 112 of the UAV 110 provides a cover for the launch container 102.

Figure 7:
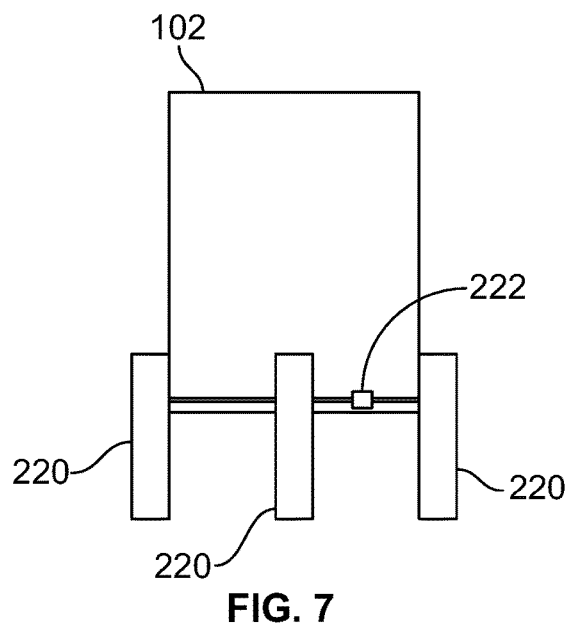
FIG. 7 illustrates a simplified view of a launch container, according to an embodiment of the present disclosure.

FIG. 7 illustrates a simplified view of the launch container 102, according to an embodiment of the present disclosure. In this embodiment, one or more pontoons 220 are secured to the launch container 102. The pontoons 220 provide buoyancy to the launch container 102. The pontoons 220 may be inflatable. In at least one embodiment, a container 222 of compressed inflation gas (such as helium) is in fluid communication with the pontoons 220. Upon impact, a valve of the container 222 may break, and release the compressed inflation gas into the pontoons 220.

Figure 8:
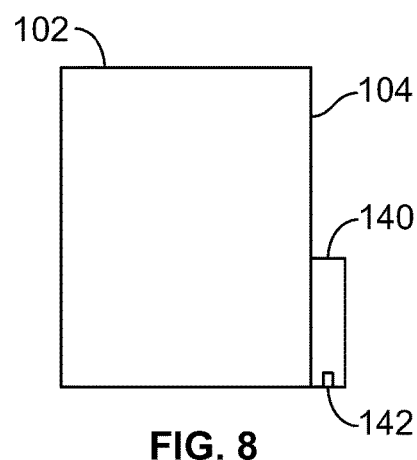
FIG. 8 illustrates a simplified view of a launch container, according to an embodiment of the present disclosure.

FIG. 8 illustrates a simplified view of the launch container 102, according to an embodiment of the present disclosure. In this embodiment, the reactant container 140 and the water inlet port 142 may be outside of the housing 104.

Figure 9:
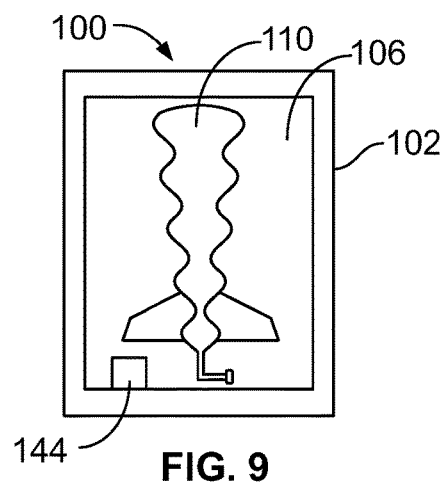
FIG. 9 illustrates a simplified view of a UAV launch system, according to an embodiment of the present disclosure.

FIG. 9 illustrates a simplified view of the UAV launch system 100, according to an embodiment of the present disclosure. In this embodiment, the reactant 144 is contained within the internal chamber 106 of the launch container 102. The reactant 144 may or may not be within a separate and distinct container within the internal chamber 106.

Figure 10:
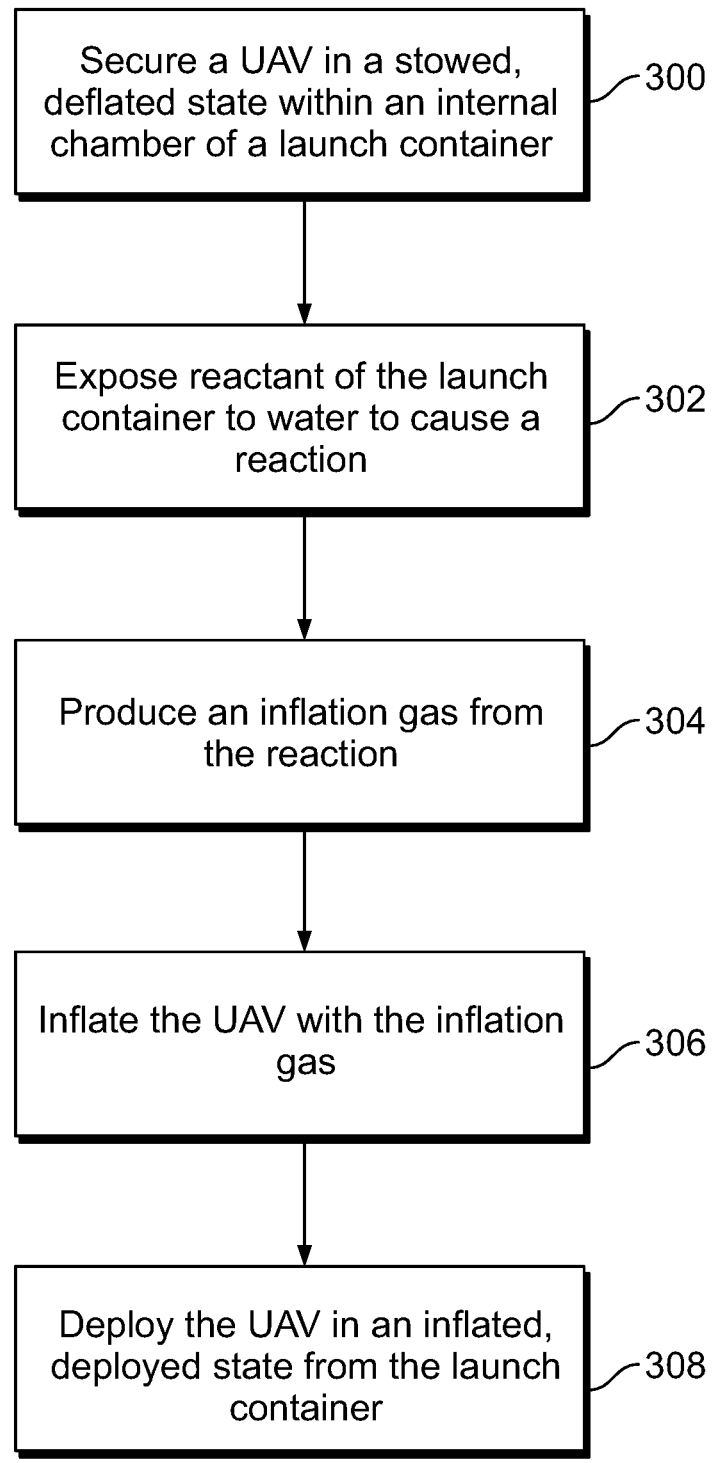
FIG. 10 illustrates a flow chart of a UAV launch method, according to an embodiment of the present disclosure.

FIG. 10 illustrates a flow chart of a UAV launch method, according to an embodiment of the present disclosure. Referring to FIGS. 1-10, the method begins at 300, at which the UAV 110 in a stowed, deflated state is secured within the internal chamber 106 of the launch container 102.

At 302, reactant 144 of the launch container 102 (for example, contained within or secured to an outer portion of the launch container 102) is exposed to water (such as salt water) to cause a reaction. At 304, an inflation gas is produced from the reaction of the water contacting the reactant.

At 306, the main body 112 of the UAV 110 is inflated with the inflation gas. At 308, the UAV 110 is deployed in an inflated, deployed state from the launch container 102.

As described herein, embodiments of the present disclosure provide an autonomous, high-endurance, launch container-encapsulated UAV 110 that may be configured to provide an airborne, over-the-horizon communication capability and persistent sensor platform. The UAV launch system 100 allows a relatively large airship to be encapsulated in the compact launch container 102, due to the UAV 110 receiving lifting gas from the reactant 144 and seawater.

Unlike fixed wing UAVs, the UAV 110 may fly very slowly and also hover, relying on static rather than aerodynamic lift, which requires little power consumption. The batteries 123 may be recharged from solar, thermal and wind energy. The UAV 110 may remain on station for weeks, unlike canister launched fixed-wing UAVs, whose endurance is but a few hours. The endurance of the UAV 110 may be extended dramatically by alighting on the water surface to replenish its supply of lifting gas either through electrolysis or by retaining a small supply of hydrogen-producing reactant on board.

The UAV launch system 100 allows a relatively large UAV 110 (such as an inflatable airship) to be encapsulated in the comparatively compact launch container 102, due to the UAV 110 receiving the inflation gas from the reaction of the reactant 144 with the water 200. As such, inflation gas need not be stored in the UAV launch system 100, thereby decreasing weight, and increasing internal space within the launch container 102 (due to there not being a separate container of inflation gas). The reactant 144 may reside within a small portion of the internal chamber 106 of the launch container 102. In general, producing the lifting gas from the reaction of the reactant 144 with the water 200 (such as seawater) eliminates the need to store the gas in compressed form, allowing a relatively large UAV 110 to fit within the launch container 102.

In at least one embodiment, the main body 112 of the UAV 110 may inflate in response to the launch container 102 floating on a surface of water. For example, the water inlet port 142 may be coupled to an inlet valve that opens when the launch container 102 is at or proximate to a surface of the water. The inlet valve may be coupled to a timer, accelerometer, altimeter, or the like that sends an opening signal to the inlet valve in response to a predetermined condition (such as a predetermined time, altitude in relation to sea level, and/or the like).

In at least one other embodiment, the main body 112 may begin to inflate as the UAV launch system 100 is deployed underneath the water, such as from a submarine. For example, the water inlet port 142 may provide water ingress into the reactant container 140 underneath an upper surface of the water. As such, the main body 112 may begin to inflate prior to the launch container 102 floating at the top surface of the water. The inflation of the main body 112 below the top surface of the water may increase the buoyancy of the launch container 102, and thereby decrease a time for the UAV launch system 100 to reach the top surface of the water.

In at least one embodiment, the launch container 102 may include a deployable parachute. For example, when launched from an aircraft, the launch container 102 may deploy the parachute to slow the rate of descent into a body of water.

In at least one embodiment, the lifting gas generated by the reaction of the reactant 144 with the water is hydrogen. In at least one other embodiment, the lifting gas may be helium.

Utilizing chemical reactions to generate the lifting gas allows the UAV 110 to not only refrain from carrying its own supply of lifting gas in a compressed compartment (which typically requires extremely high pressures to store sufficient quantities of lifting gas), but to also replenish its supply of lifting gas during its mission. In general, the reactant 144 may be in dry granular form and is safe to handle. Products of the reaction other than hydrogen may be discarded (or used as ballast). The reaction container 140 detaches from the UAV 110 to save weight, though a small reserve of reactant 144 may be maintained to replenish the hydrogen lifting gas in lieu of using electrolysis.

Seawater includes at least one reactant, thereby greatly reducing the weight of reactant 144 that is present in the UAV launch system 100. An exemplary reaction between the reactant 144 and seawater is that of Sodium Borohydride and water:

$$NaBH_4 + 2H_2O(l) \xrightarrow{Accelerator\ (B_2O_3)} NaBO_2 + 4H_2(g)$$

To expedite generation of the lifting gas, the reaction may proceed in the presence of an accelerator, such as boric oxide, $B_2O_3$.

As one non-limiting example, to lift a UAV 110 variant weighing 14 pounds (lbs.) requires 234.644 moles of hydrogen lifting gas. As such, 58.661 moles of sodium borohydride ($NaBH_4$) and 29.3305 moles of boric oxide are used. Liquid water $H_2O$ is ingested into the reactant container 144 from the ocean surface.

A total of approximately 4.26 kilograms (kg), or 9.3917 lbs., of sodium borohydride and boric oxide are carried as the reactant 144. This requires only about 10 percent of the volume of the internal chamber 106 of the launch container 102. As such, 90 percent of the volume of the internal chamber 106 may be used to carry other components, such as the UAV 110. In this manner, use of the reactant 144 and the water 200 to generate the lifting gas allows for an inflatable UAV 110 of increased size. That is, the volume ratio between the UAV 110 and components within the launch container 102 for producing the lifting gas (for example, the reactant container 140 and/or the reactant 144) may be 9:1. In at least one embodiment, the weight of the reactant 144 may be between 50 percent and 100 percent of the weight of the UAV 110.

The propulsion system 118 may include one or more propellers that also serve as wind turbines to provide power. For example, should there be insufficient battery or solar power, the UAV 110 may switch to power-conservation mode and use the propellers to charge the batteries 123. The propellers may be used when the UAV 110 has touched down on the water 200. When solar power is unavailable, such as at night, and wind conditions allow, the propellers may be used as turbines to supply power.

The propellers may be driven by electric motors directly, so as to eliminate gearing (and the associated weight). The propellers and electric motors may be situated above pontoons to avoid contact with salt water. The propellers may be articulated, so that thrust may be directed as needed including upward and downward directions.

The UAV 110 may include control surfaces modified to deploy from the launch container 102. The control surfaces may include fold-out rudders, stabilizers and an aerodynamic envelope. The shape of the envelope may be maintained by ballonets, as is conventional for non-rigid airships.

Additional control mechanisms may include vents within the envelope for venting lifting gas when, for example, the pressure height—the altitude at which the envelope is fully inflated and ballonets are empty—would be exceeded. Additionally, a ballast mechanism which allows the UAV 110 to eject ballast so as to gain height quickly may be used. Ballast may take the form of seawater and be replenished when the vehicle rests on the surface of the water. Expendables may also provide ballast and be dropped, as necessary.

As described herein, embodiments of the present disclosure provide efficient systems and methods of storing and deploying UAVs.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An unmanned aerial vehicle (UAV) launch system comprising:
   a launch container including a housing defining an internal chamber;
   a UAV including a main body defining an inflatable envelope, wherein the UAV is configured to be contained within the internal chamber, wherein the main body is in a deflated state when the UAV is contained within the internal chamber; and
   a reactant that is configured to react with water to produce a lifting gas, wherein the inflatable envelope is configured to be inflated by the lifting gas in response to the reactant reacting with the water to deploy the UAV from the launch container.

2. The UAV launch system of claim 1, wherein the lifting gas comprises hydrogen.

3. The UAV launch system of claim 1, wherein the reactant comprises sodium borohydride and boric oxide.

4. The UAV launch system of claim 1, wherein the weight of the reactant is between 50 percent and 100 percent of the weight of the UAV.

5. The UAV launch system of claim 1, wherein a volume ratio between the UAV and the reactant within the internal chamber of the launch container is 9:1.

6. The UAV launch system of claim 1, wherein the reactant is contained within a reactant container.

7. The UAV launch system of claim 6, wherein the reactant container is within the internal chamber of the launch container.

8. The UAV launch system of claim 1, further comprising a water inlet port that is configured to channel the water to the reactant.

9. The UAV launch system of claim 1, wherein the launch container further comprises a cover moveably coupled to the housing, wherein the cover is moveable between an open position and a closed position, and wherein inflation of the inflatable envelope causes the cover to move from the closed position to the open position.

10. The UAV launch system of claim 9, wherein a portion of the UAV forms the cover.

11. The UAV launch system of claim 1, wherein the UAV further comprises an inflation inlet port in fluid communication with the inflatable envelope.

12. The UAV launch system of claim 11, wherein the reactant is contained within a reactant container that is in fluid communication with the inflation inlet port through a detachable coupling, and wherein the main body detaches from the detachable coupling in response to the UAV inflating into an inflated state.

13. The UAV launch system of claim 1, wherein the UAV further comprises a propulsion system.

14. The UAV launch system of claim 1, wherein the UAV further comprises a payload.

15. The UAV launch system of claim 14, wherein the payload comprises one or more of a control unit, one or more batteries, a communication device, an imaging system, a navigation system, and ordnance.

16. The UAV launch system of claim 1, further comprising one or more pontoons coupled to the launch container.

17. The UAV launch system of claim 16, further comprising a container of helium in fluid communication with the one or more pontoons, wherein the one or more pontoons are configured to be inflated by the helium.

18. An unmanned aerial vehicle (UAV) launch method comprising:
   providing a launch container including a housing defining an internal chamber;
   securing a UAV including a main body defining an inflatable envelope within the internal chamber, wherein the securing comprises providing the main body in a deflated state;
   exposing a reactant to water to cause a reaction that produces a lifting gas;
   inflating the inflatable envelope with the lifting gas due to the exposing; and
   deploying the UAV from the launch container due to the inflating.

19. The UAV launch method of claim 18, further comprising channeling the water to the reactant via a water inlet port.

20. An unmanned aerial vehicle (UAV) launch system comprising:
   a launch container including a housing defining an internal chamber;
   a UAV including a main body defining an inflatable envelope, a propulsion system, and a payload, wherein the UAV is configured to be contained within the internal chamber, wherein the main body is in a deflated state when the UAV is contained within the internal chamber;
   a reactant container within the internal chamber, wherein the reactant container contains a reactant including sodium borohydride and boric oxide, wherein the weight of the reactant is between 50 percent and 100 percent of the weight of the UAV, wherein a volume ratio between the UAV and the reactant within the internal chamber of the launch container is 9:1, wherein the reactant is configured to react with water to produce a lifting gas including hydrogen, wherein the inflatable envelope is configured to be inflated by the lifting gas in response to the reactant reacting with the water to deploy the UAV from the launch container; and
   a water inlet port that is configured to channel the water to the reactant.

* * * * *